(12) United States Patent
Boom et al.

(10) Patent No.: US 11,628,720 B2
(45) Date of Patent: Apr. 18, 2023

(54) ADJUSTMENT DEVICE FOR AN AIR INFLUENCING ELEMENT, METHOD FOR ADJUSTING AN AIR INFLUENCING ELEMENT WITH AN ADJUSTMENT DEVICE, MOTOR VEHICLE PROVIDED WITH AN AIR INFLUENCING ELEMENT WITH AN ADJUSTMENT DEVICE

(71) Applicant: MCI (Mirror Controls International) Netherlands B.V., Woerden (NL)

(72) Inventors: Stephen Alexander George Gustavo Boom, Zeist (NL); Marius Brand, Amersfoort (NL)

(73) Assignee: MCi (Mirror Controls International) Netherlands B.V., Woerden (NL)

( * ) Notice: Subject to any disclaimer, the term of this patent is extended or adjusted under 35 U.S.C. 154(b) by 434 days.

(21) Appl. No.: 16/643,788

(22) PCT Filed: Aug. 31, 2018

(86) PCT No.: PCT/NL2018/050564
§ 371 (c)(1),
(2) Date: Mar. 2, 2020

(87) PCT Pub. No.: WO2019/045567
PCT Pub. Date: Mar. 7, 2019

(65) Prior Publication Data
US 2020/0215899 A1   Jul. 9, 2020

(30) Foreign Application Priority Data

Aug. 31, 2017   (NL) ...................................... 2019471

(51) Int. Cl.
*B60K 11/08*   (2006.01)
*B62D 35/00*   (2006.01)
(Continued)

(52) U.S. Cl.
CPC ............ *B60K 11/085* (2013.01); *B62D 35/00* (2013.01); *F16H 1/206* (2013.01); *F16H 19/08* (2013.01);
(Continued)

(58) Field of Classification Search
CPC ................. F16H 2702/02; F16H 19/08; F16H 2057/02034; B60K 11/085; B60K 11/08; H02K 2213/06
See application file for complete search history.

(56) References Cited

U.S. PATENT DOCUMENTS

2014/0342655 A1   11/2014   Boom et al.
2016/0016461 A1*   1/2016   de Vries ................. H02K 7/116
                                                                74/89.16
(Continued)

FOREIGN PATENT DOCUMENTS

DE           3905717 A1    8/1990
DE      102011087120 A1    5/2013
(Continued)

*Primary Examiner* — Jake Cook
(74) *Attorney, Agent, or Firm* — Volpe Koenig

(57) ABSTRACT

Adjustment device for adjusting an air influencing element of a motor vehicle between at least a first position and a second position, comprising a driving unit for adjusting the air influencing element between at least the first position and the second position, provided with an input shaft and an output shaft which is at a distance from the axis of the input shaft, wherein the driving unit has a first part which is provided around the input shaft of the driving unit, and has a second part which is provided around the output shaft of the driving unit, wherein the adjustment device is furthermore provided with a failsafe mechanism, wherein the failsafe mechanism engages the first part of the driving unit.

23 Claims, 13 Drawing Sheets

Figure 1:
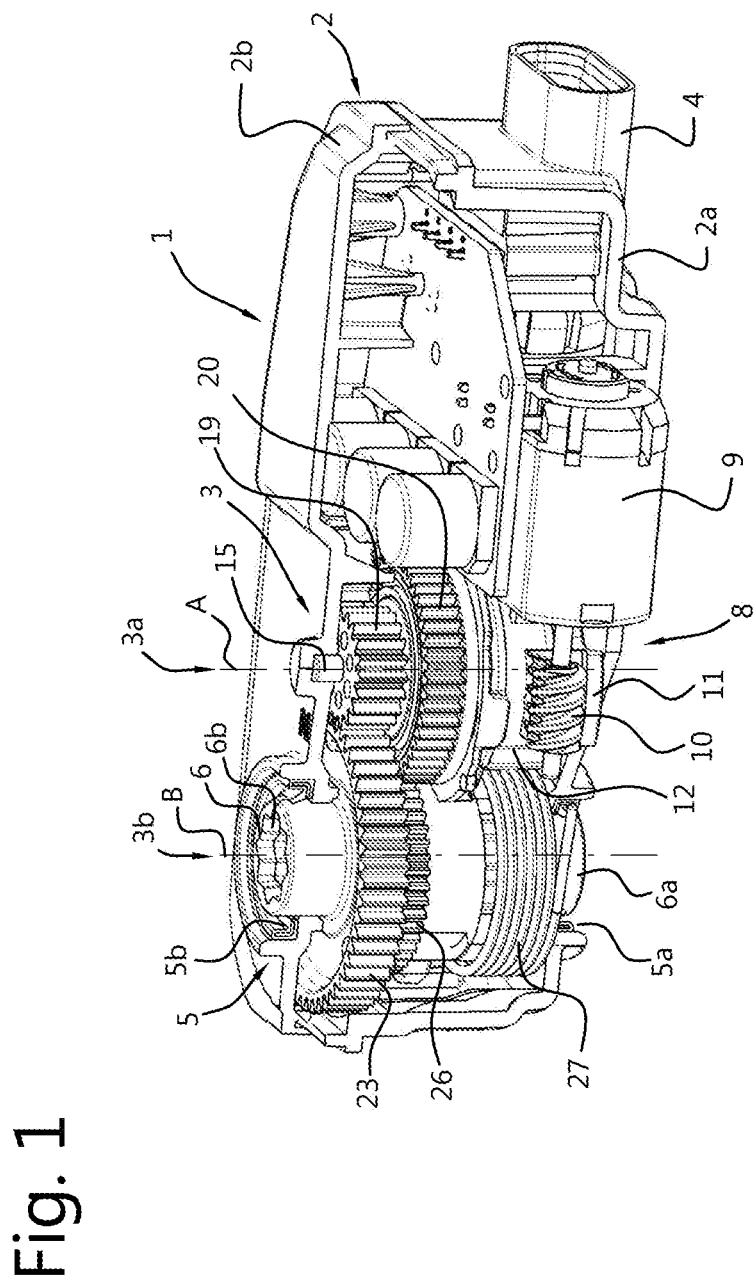

(51) Int. Cl.
 *F16H 1/20* (2006.01)
 *F16H 19/08* (2006.01)
 *F16H 37/04* (2006.01)

(52) U.S. Cl.
 CPC ....... *F16H 37/041* (2013.01); *F16H 2702/02* (2013.01)

(56) References Cited

U.S. PATENT DOCUMENTS

2016/0230820 A1* 8/2016 Matthews ............ H02K 7/1166
2017/0297424 A1* 10/2017 Ibañez ................. B60K 11/085

FOREIGN PATENT DOCUMENTS

| DE | 102012103464 A1 | 10/2013 |
| JP | 2014523833 A | 9/2014 |
| WO | 2013/012337 A1 | 1/2013 |

* cited by examiner

ADJUSTMENT DEVICE FOR AN AIR INFLUENCING ELEMENT, METHOD FOR ADJUSTING AN AIR INFLUENCING ELEMENT WITH AN ADJUSTMENT DEVICE, MOTOR VEHICLE PROVIDED WITH AN AIR INFLUENCING ELEMENT WITH AN ADJUSTMENT DEVICE

CROSS REFERENCE TO RELATED APPLICATIONS

This application is a 35 USC § 371 National Stage application of International Patent Application No. PCT/NL2018/050564, which was filed Aug. 31, 2018, entitled "ADJUSTMENT DEVICE FOR AN AIR INFLUENCING ELEMENT, METHOD FOR ADJUSTING AN AIR INFLUENCING ELEMENT WITH AN ADJUSTMENT DEVICE, MOTOR VEHICLE PROVIDED WITH AN AIR INFLUENCING ELEMENT WITH AN ADJUSTMENT DEVICE" and Netherlands Patent Application No. 2019471, which was filed Aug. 31, 2017, and are incorporated herein by reference as if fully set forth.

The invention relates to an adjustment device for adjusting an air influencing element of a motor vehicle.

An air influencing element can be, for example, an air inlet of a motor vehicle, in particular adjustable strips or flaps of the air inlet. An air influencing element can be, for example, a wing which is situated at an outer side of a motor vehicle, or an air dam or spoiler which is situated at an underside of a motor vehicle. The air influencing elements, also called air guiding elements, guide or manipulate an air stream in and/or around a vehicle.

It is known to make an air influencing element, such as an air inlet of a motor compartment, adjustable, whereby the air inlet can be adjusted between an open position and a closed position. To this end, the air inlet may be provided with elements to be adjusted, for example strips or flaps, which can be adjusted, for example pivoted about an upright or lying axis.

In the closed position of the air inlet the air resistance of the vehicle is lowered, which is beneficial to the fuel consumption of the motor. Further, where the efficiency of the motor, fuel consumption and $CO_2$ emission are concerned, a motor of a motor vehicle has an optimum operating temperature, which is typically higher than the ambient temperature. A closed air inlet when the motor is cold is then once again beneficial to fuel consumption. Also, during driving with an open air inlet, the temperature of the motor can fall below the optimum operating temperature, so that fuel consumption may increase. Fuel consumption of the motor may also increase at an operating temperature above the optimum operating temperature.

A motor vehicle may be provided with one or more wings as air influencing elements. A wing may be situated, for example, at the back of the vehicle, or at a side or at a front. Particularly at high speeds of the vehicle, a wing can provide for downward force to keep the vehicle stably on the ground. At low speeds, by contrast, a wing generates mainly resistance, which leads to more fuel consumption. It is hence advantageous to make a spoiler adjustable.

A motor vehicle may be provided with one or more spoilers as air influencing elements. A spoiler is intended for disturbing unwanted air streams around the vehicle, so that resistance can diminish. A spoiler may be situated at a back, a side, a front or also a bottom of the vehicle. When a spoiler is situated at a front or a bottom, it is also called air dam. In particular when a spoiler, or air dam, is situated at a bottom of the vehicle, and there, by influencing air streams, can thus reduce the development of whirls between the underside of the vehicle and the road, the resistance of the vehicle during driving can diminish, which can lead to less fuel consumption. However, when an air dam extends at the underside of the vehicle, it is exposed to obstacles that are on the road, such as a speed bump, or loose chippings or grit. This can lead to damage of the air dam. It may hence be advantageous to make an air dam, in particular an air dam at an underside of the vehicle, adjustable.

It may be advantageous, then, to make an air influencing element of a motor vehicle adjustable. To this end, the air influencing element is usually coupled to an adjustment device which comprises a driving unit. With the aid of the driving unit, the air influencing element can be adjusted between a first position and a second position. When in the case of a closed air inlet the operating temperature of the motor runs up too high, the air inlet can be opened again to provide for sufficient cooling. A wing or an air dam may be adjusted, for example, between a first position in which they extend substantially along the vehicle and a second position in which they extend from the vehicle at an angle.

For an air inlet, solutions are known to allow the air inlet, in case of a failure in the adjustment device, still to be opened when closed. Such a failsafe provision in an adjustment device is used in order to adjust, in case of a calamity, the shutoff elements of the air inlet to a predefined position, usually the open position of the shutoff elements.

Publication WO 2013/012337, for example, describes an adjustment device with a failsafe provision which comprises a spring which is connected to the output shaft of the adjustment device. The spring is retained, against the spring tension, by an arm which is retained under the influence of magnetic force. In case of a calamity, such as power failure, the magnetic force drops out and the arm moves to release the spring. Under the influence of the spring force, the output shaft of the adjustment device is thus adjusted to the open position.

A disadvantage of the known adjustment device is that it may be relatively voluminous, and does not always fit within the space available in the vehicle. Also, by the use of tolerance-sensitive parts, the reliability of the adjustment device may sometimes leave to be desired. Also, it has appeared that the adjustment device is relatively expensive.

An object of the invention is to provide an adjustment device that counteracts at least one of the above-mentioned disadvantages. In particular, it is desired to provide an adjustment device that can be relatively compact and/or inexpensive and/or reliable.

To this end, the invention provides an adjustment device for adjusting an air influencing element of a motor vehicle between at least a first position and a second position, comprising a driving unit for adjusting the air influencing element between at least the first position and the second position, provided with an input shaft and an output shaft which is at a distance from the axis of the input shaft, wherein the driving unit has a first part which is provided around the input shaft of the driving unit, and has a second part, wherein the adjustment device is furthermore provided with a failsafe mechanism, wherein the failsafe mechanism engages the first part of the driving unit.

Advantageously, the second part of the driving unit may be situated around the axis of the output shaft, while, preferably, the output shaft is at a distance from the input shaft, so that the driving unit can be made of relatively compact design. More preferably, the output shaft is approximately parallel to the input shaft, in this way the driving unit can be made of relatively flat design.

Advantageously, the adjustment device is provided with a failsafe mechanism. The failsafe mechanism is activated in the event of a calamity, for example in case of power failure or in case of fire in the motor compartment for an air inlet, or when an air dam or a spoiler contacts an obstacle. The failsafe mechanism is configured, in the event of a calamity, to adjust the air influencing element to a predefined position, for example the first position, or the second position. Advantageously, the failsafe mechanism is configured to engage the first part of the driving unit. In contrast to known failsafe mechanisms, which engage the output shaft directly, the failsafe mechanism in accordance with the invention engages the first part of the driving unit which is positioned around the input shaft. Thus, the failsafe mechanism can be made of lighter design, since it is not directly subject to the forces acting on the output shaft of the driving unit. This is because, preferably, the second part is coupled to the first part with a transmission ratio, the transmission ratio being chosen such that the forces on the first part of the driving unit are smaller than on the second part, with the output shaft. Due to the failsafe mechanism engaging the first part, the forces that the failsafe mechanism experiences are also smaller, so that the failsafe mechanism can be made of lighter and more compact design.

The failsafe mechanism can comprise different parts, but engages, in accordance with the invention, the first part of the driving unit. Parts or components of the failsafe mechanism may be situated in the first part of the driving unit, around the input shaft, and/or parts or components of the failsafe mechanism may be situated in the second part of the driving unit, around the output shaft, and/or parts or components of the failsafe mechanism may be situated next to the first part and/or the second part of the driving unit. Many variants and positions of the failsafe mechanism and/or components of the failsafe mechanism are thus possible, with the failsafe mechanism in each case engaging the first part of the driving unit.

Thus, for example, there may be provided an energy element, such as a tension spring, which is pretensioned (biased) to the predefined position of the air influencing elements in the case where the failsafe mechanism comes into operation. Such a tension spring, or other elastic element, can provide the energy that is needed to adjust the air influencing elements in the event of a calamity to the predefined position, via the driving unit. For example, the tension spring may by one end be connectable, detachably or undetachably, with the first part of the driving unit, or with the second part of the driving unit, and by another end be connected with the fixed world. The tension spring may be situated in the second part of the driving unit, or in the first part of the driving unit, or may be placed in the driving unit separately from the first part and from the second part. The failsafe mechanism itself engages the first part of the driving unit, for example by retaining or blocking an element or component of the first part and releasing this component in case of a calamity. Whereupon, for example, the energy can be released from the tension spring to adjust the output shaft, whether or not via the first part of the driving unit, to the predefined position of the air influencing elements.

By coupling the second part of the driving unit to the first part of the driving unit with a transmission ratio, the first part of the driving unit, as well as the failsafe mechanism, can be made of lighter design. After all, not the full forces on the output shaft then act on the first part and/or the failsafe mechanism, but only a part of those forces in accordance with the transmission ratio. For example, if the transmission ratio of the coupling between the first part and the second part is one to three, then the first part of the driving unit and/or the failsafe mechanism only experience one-third of the forces on the output shaft. This way, the first part and/or the failsafe mechanism can hence be lighter and cheaper in design. Obviously, other transmission ratios can also be possible.

Advantageously, the input shaft is connected with a main driving motor and the output shaft is configured to be connectable with the air influencing element. This way, the adjustment device can be coupled with the air influencing element in a compact manner. For example, the adjustment device may be provided with a housing. The main driving motor may be situated in the housing, while the output shaft of the driving unit can extend through the housing, thus being simply couplable with the air influencing element, for example with shutoff elements of the air inlet, with the spoiler or with the air dam.

Advantageously, the first part of the driving unit comprises a planetary gear system, comprising a sun gear, at least one planet gear, a planet carrier and a ring gear, while the sun gear is connected with the input shaft. The second part of the driving unit comprises an output gear which forms the output shaft of the driving unit.

The output gear of the second part of the driving unit is coupled with a transmission ratio to an output of the planetary gear system, for example the planet carrier. Thus, the transmission ratio between the first part and the second part can be realized in a simple manner.

The ring gear of the planetary gear system is preferably detachably connected with the fixed world, for example a housing of the adjustment device. By providing the ring gear as being detachably connectable with the fixed world, the failsafe mechanism, when activated, can drive the ring gear as a second input of the planetary gear system. Advantageously, the failsafe mechanism is configured to uncouple the ring gear of the planetary gear system from the fixed world, in a failsafe condition, to adjust the output of the second part of the driving unit. In this way, then, via the ring gear, the second part of the driving unit can be driven in a failsafe condition, for example via a coupling gear. The coupling gear is preferably positioned rotatably centered around the output gear of the second part of the driving unit and is rotatably coupled with the ring gear of the planetary gear system of the first part of the driving unit, preferably rotatably coupled with an external toothing on the ring gear of the planetary gear system of the first part of the driving unit. The coupling gear is advantageously pretensioned (biased) to a predefined position, for example under the influence of an elastic element such as a spring element. By biasing the coupling gear to the predefined position, in the event of a failsafe condition, the output shaft can be adjusted to the predefined position under the influence of the bias. The coupling gear is, via the ring gear, detachably connected with the fixed world, for example the housing. In the event of a calamity, the failsafe mechanism will break the coupling of the coupling gear with the fixed world, and, via the ring gear and the planetary gear system, the output gear can still be adjusted for adjustment of the air inlet to the predefined position.

The failsafe mechanism is usually provided with an energy storage element and/or an activation element. The activation element can undo the ring gear's rotation-lock with the fixed world. Advantageously, the activation element is here implemented as an auxiliary driving motor. By providing an auxiliary driving motor, the relatively expensive and error-sensitive magnetic coupling element of known failsafe mechanisms can be replaced with a cheaper and more reliable auxiliary driving motor. Also, the provision of an auxiliary driving motor allows the driving unit to be made of a more compact design, since the auxiliary driving motor can take up less space than the known magnetic coupling element. The auxiliary driving motor is separate from the main driving motor, so that upon activation of the failsafe mechanism the drive of the air inlet does not proceed via the main driving motor. Also, the auxiliary driving motor drives merely the failsafe mechanism and not the output shaft. This in contrast to the main driving motor, which, via the first part and the second part of the driving unit, drives the output shaft and thereby adjusts the air influencing elements. The auxiliary driving motor, by contrast, adjusts merely the failsafe mechanism, whereby, through adjustment of the failsafe mechanism, an energy element, such as for example a tension spring, releases energy to adjust the output shaft. The auxiliary driving motor is configured for merely driving the failsafe mechanism, and is not configured for driving the output shaft. Because of this, the auxiliary driving motor can be relatively light in design.

The first part of the driving unit can comprise a clutch ring which is axially movable in a direction of the input shaft of the first part of the driving unit and is nonrotatably connected with the fixed world, for example a housing of the adjustment device, and/or the ring gear is detachably coupled with the clutch ring. By providing a clutch ring, the ring gear can be detachably couplable with the fixed world in a simple manner. The clutch ring may be axially movable and thus retain or release the ring gear under the influence of the failsafe mechanism, for example under the influence of the adjustment of a clutch gear. The clutch gear is couplable with the clutch ring, while the clutch ring is configured to be pretensioned to a release position, in the event of a failsafe condition, under the influence of an elastic element, and is configured to be held by the auxiliary driving motor, against the force of the pretension (bias), in a blocking position.

Advantageously, the adjustment device comprises a park mechanism, so that when the vehicle is parked, and hence the electrical current supply to the adjustment device is shut off, not the failsafe mechanism is activated, but the park mechanism is activated. In the adjustment device provided with the park mechanism, the bias of the clutch gear to the release position is lacking. The auxiliary driving motor will hence adjust the clutch gear to a blocking position. In the case of a park condition, the park mechanism can leave the driving unit stationary, i.e. unchanged. In the case of a failsafe condition, the park mechanism can, by discharge of the energy from the energy storage element to the failsafe mechanism, activate the failsafe mechanism. Prior to parking, usually, a vehicle control unit first receives a park signal indicating that the vehicle is being parked. In the absence of such park signal, then, when for example the current supply drops out, this will be detected as a calamity and the failsafe mechanism will come into operation.

Further advantageous embodiments are represented in the dependent claims.

The invention also relates to an air inlet provided with such an adjustment device, to a vehicle provided with such an air inlet, and to a method for adjusting an air inlet.

Figure 2:
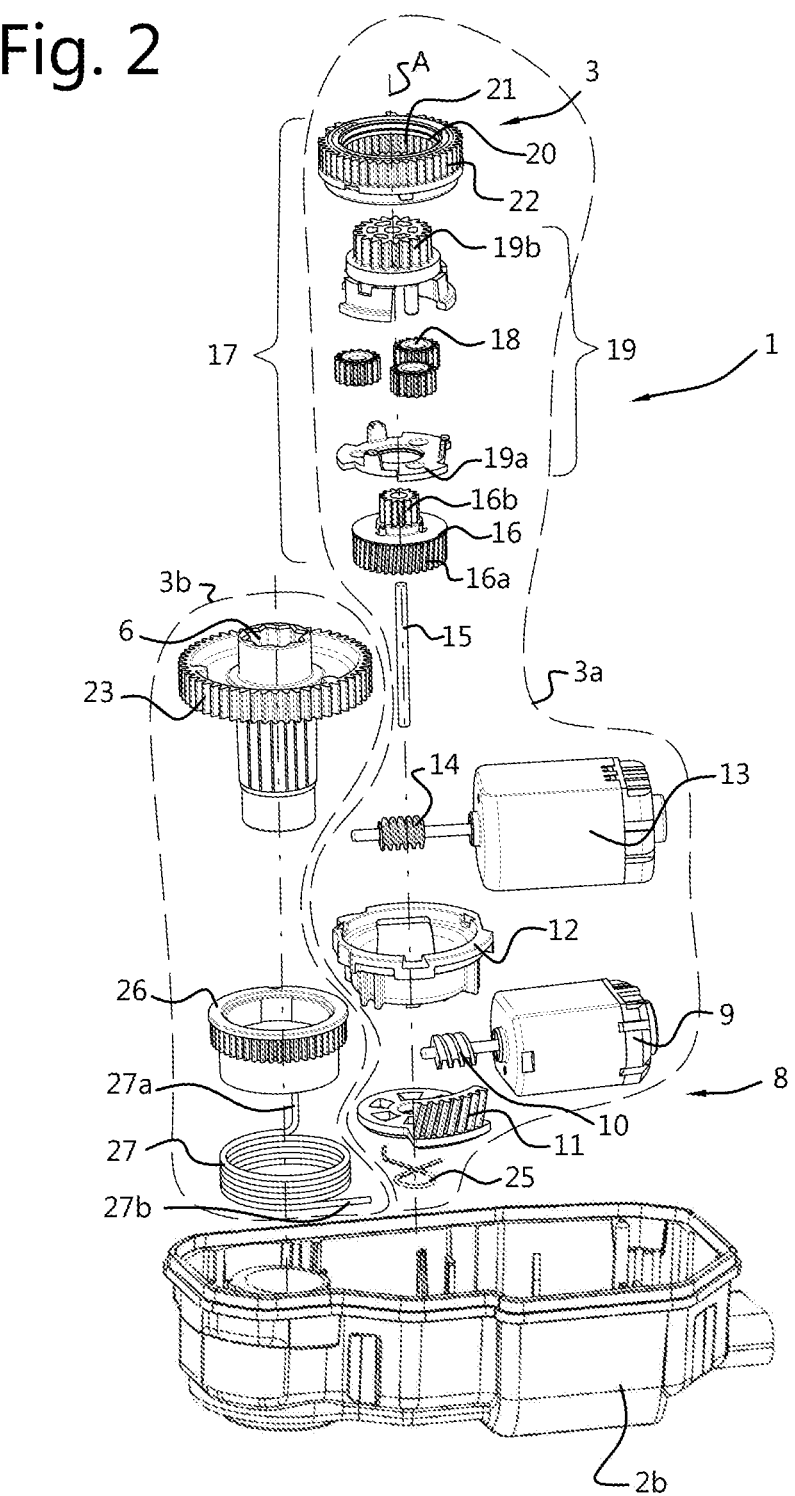
Figure 3:
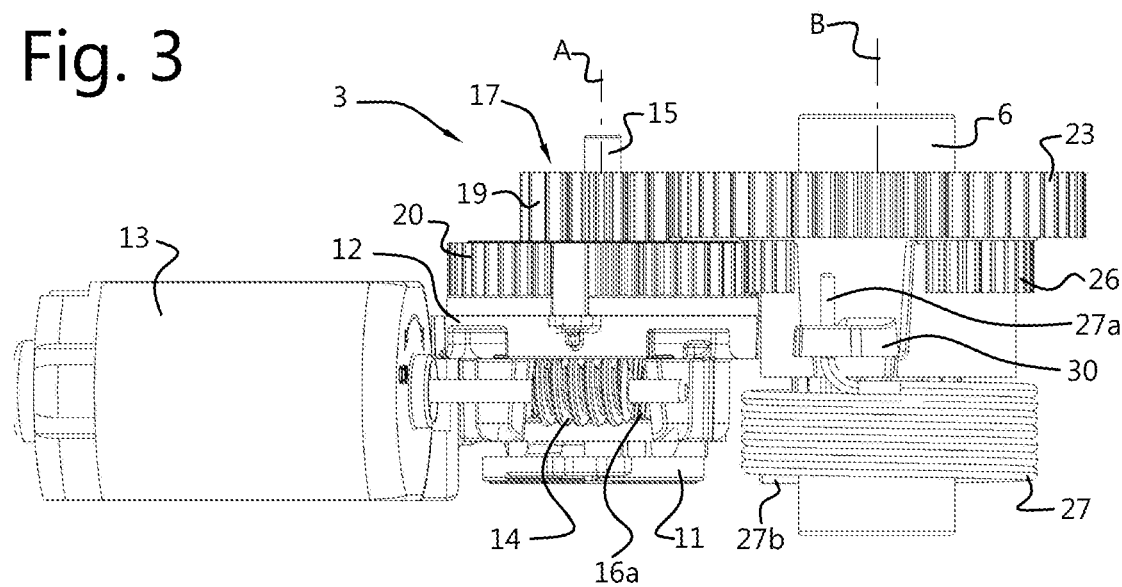
Figure 4:
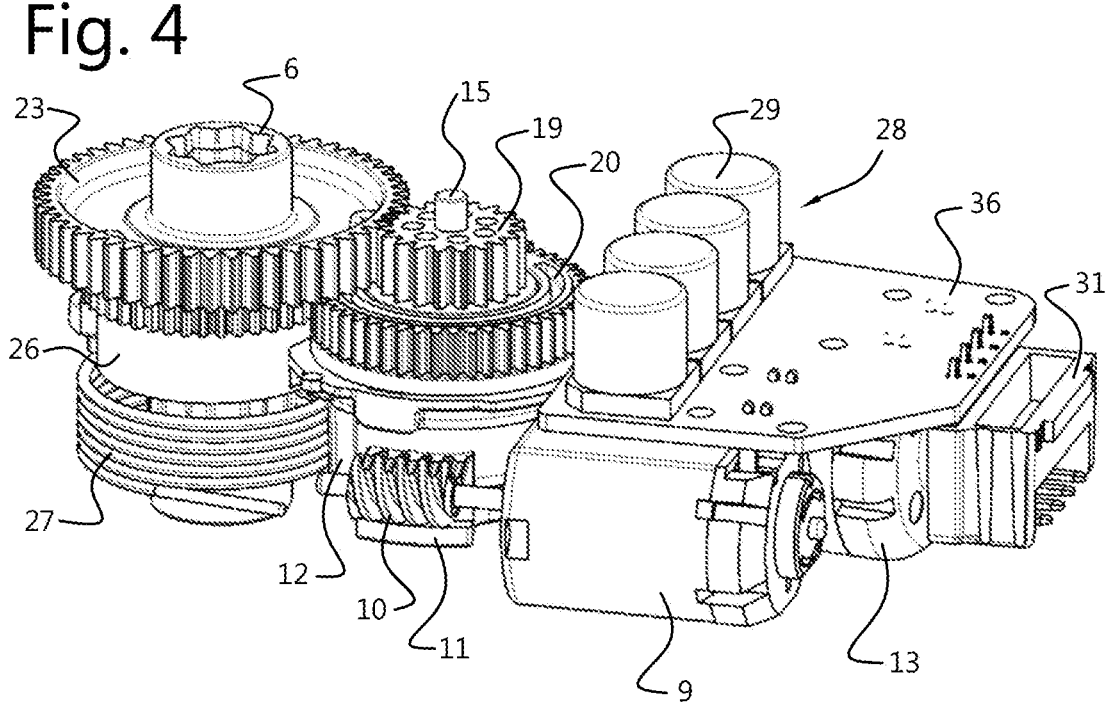
Figure 5:
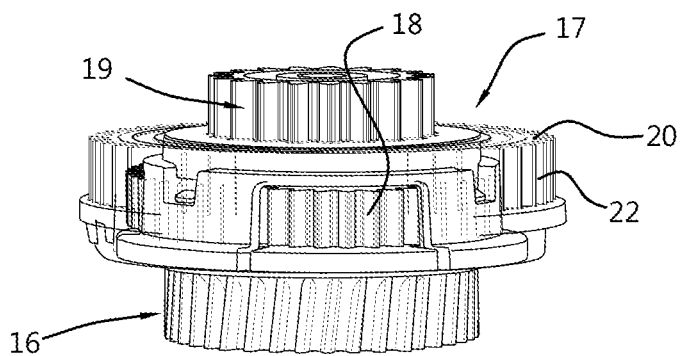
Figure 6:
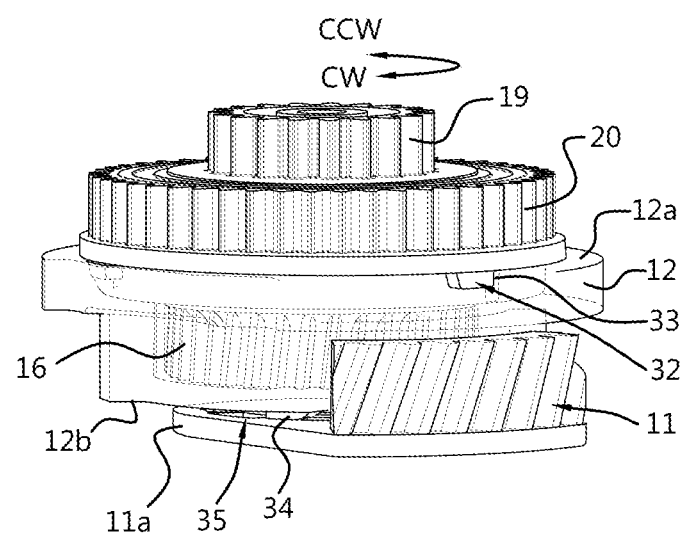
Figure 7:
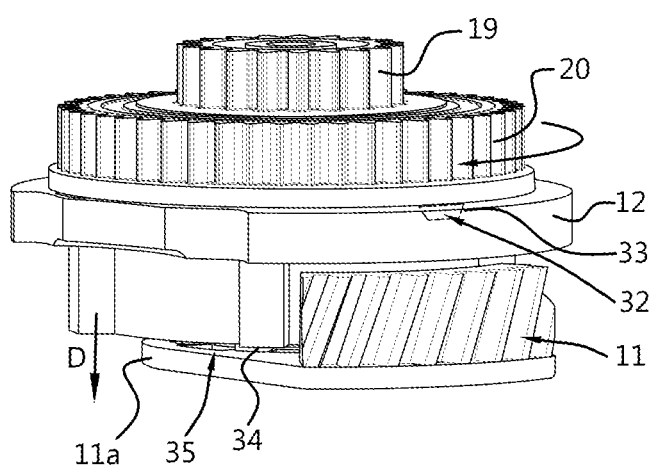
Figure 8:
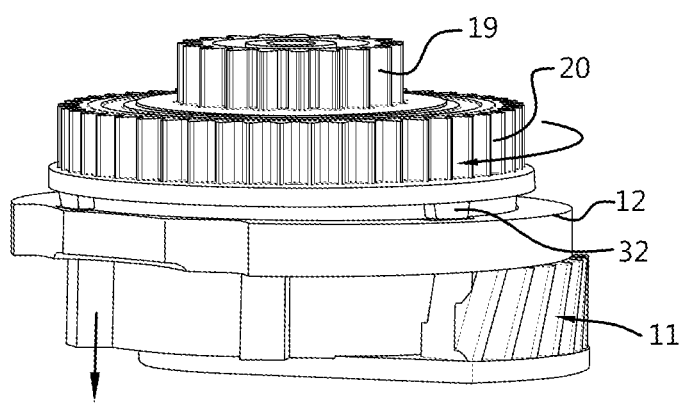
Figure 9:
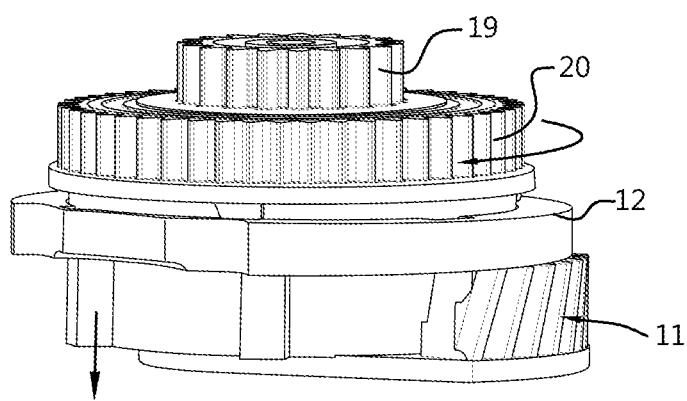
Figure 10A:
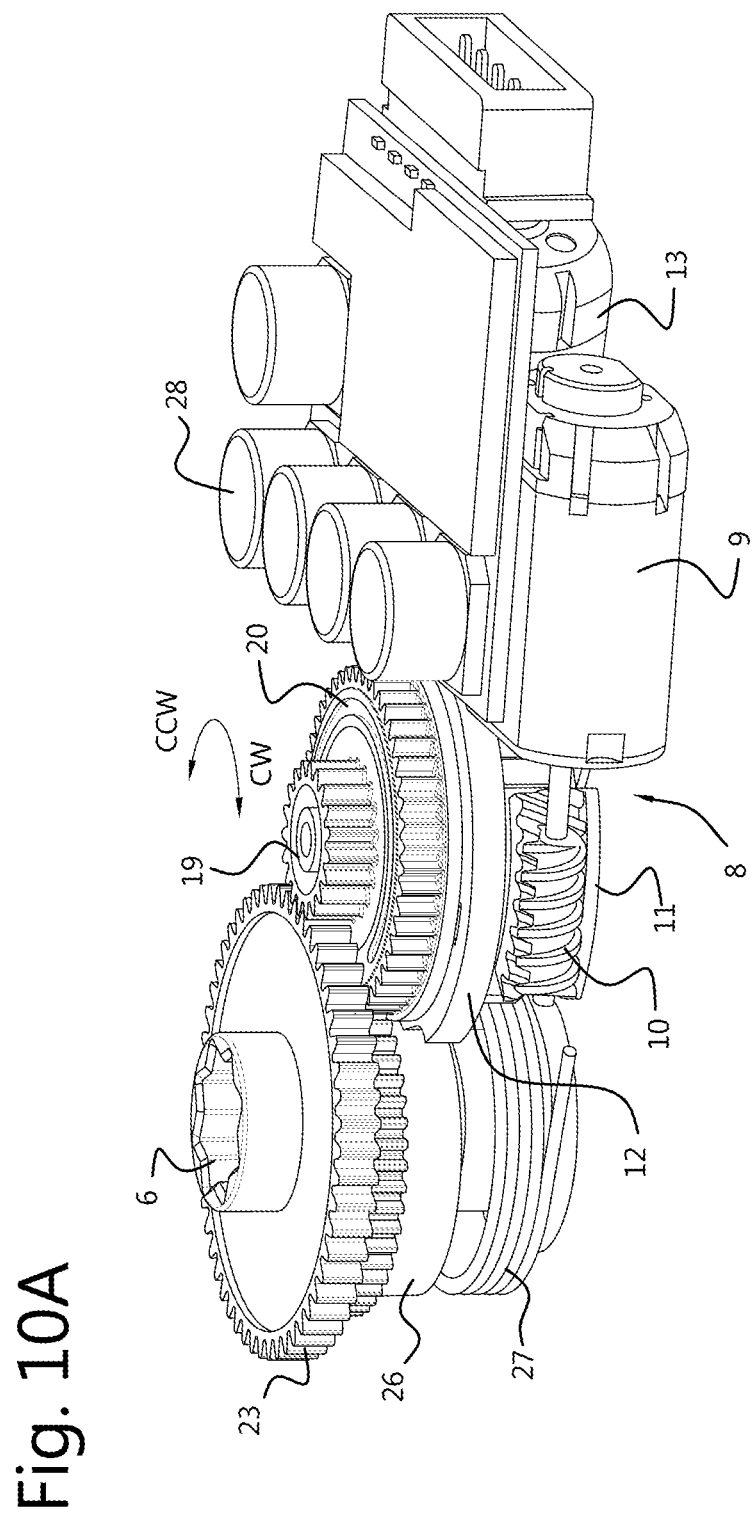

The invention will be further explained on the basis of an exemplary embodiment which is represented in a drawing. The drawing shows in the figures:

FIG. 1 a schematic perspective view of an adjustment device according to the invention;

FIG. 2 a schematic exploded view of the adjustment device according to FIG. 1;

FIG. 3 a schematic rear view of the driving unit of FIG. 1;

FIG. 4 a schematic perspective view of a driving unit of an adjustment device;

FIG. 5 a detail of the driving unit of FIG. 4;

FIG. 6 the detail of FIG. 5 provided with a clutch ring and a clutch gear;

FIG. 7 a first part of the driving unit in normal operating condition;

FIG. 8 the first part of the driving unit when the failsafe mechanism is activated;

FIG. 9 the first part of the driving unit in failsafe condition;

FIG. 10a the driving unit with the failsafe mechanism not activated; and

Figure 10B:
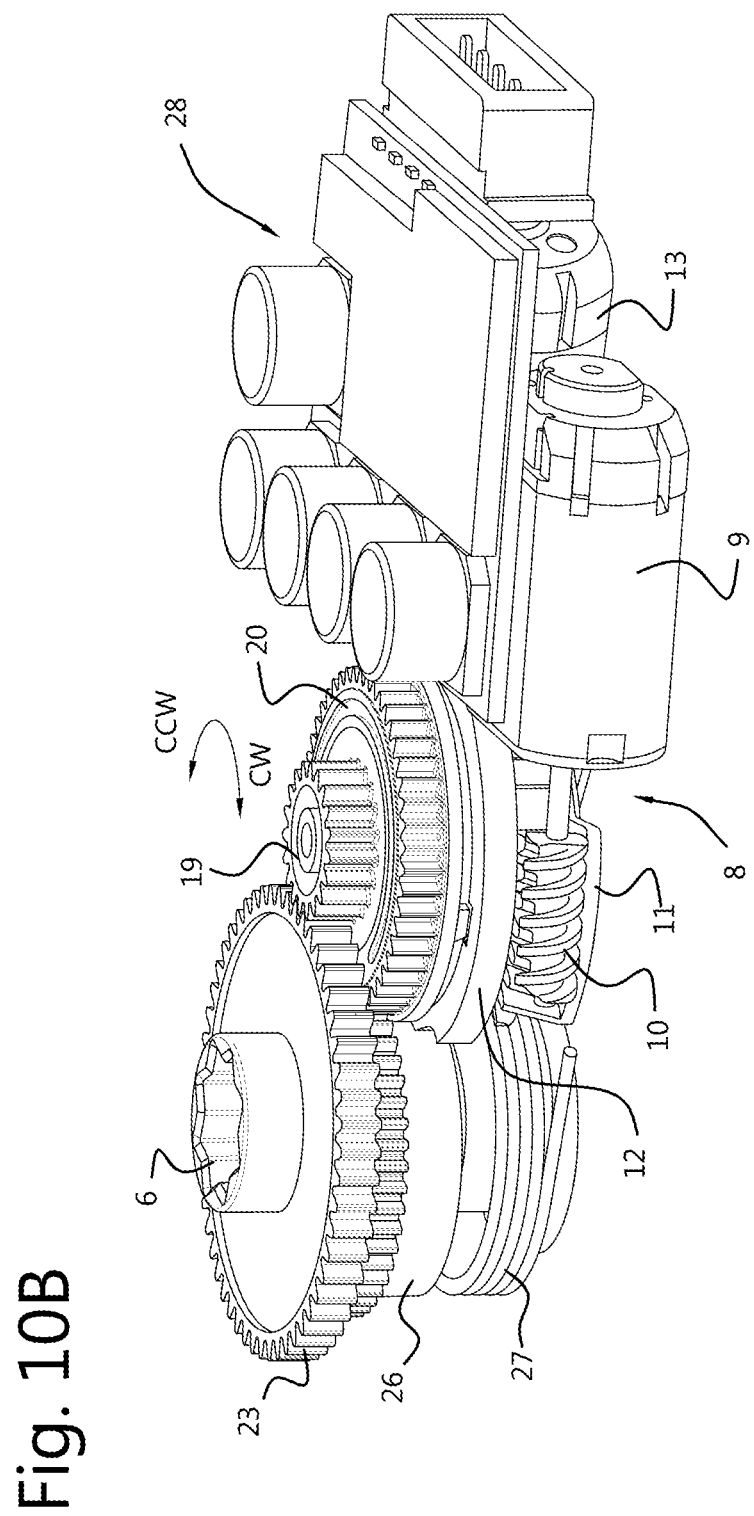
Figure 11A:
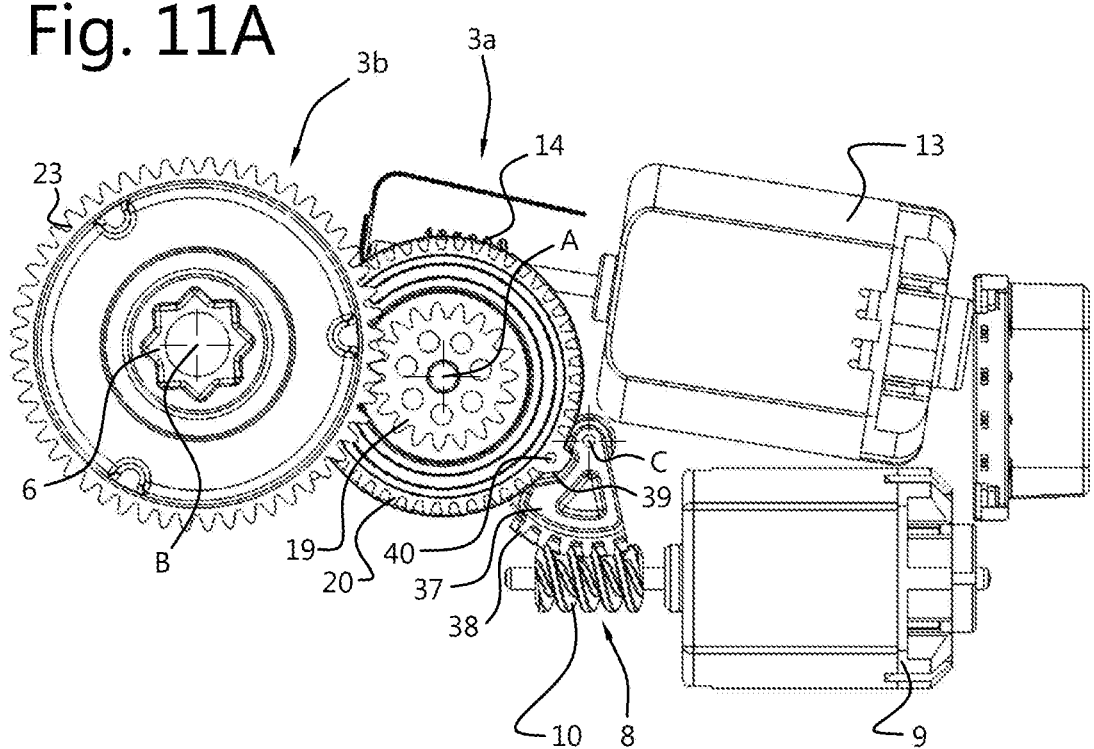
Figure 11B:
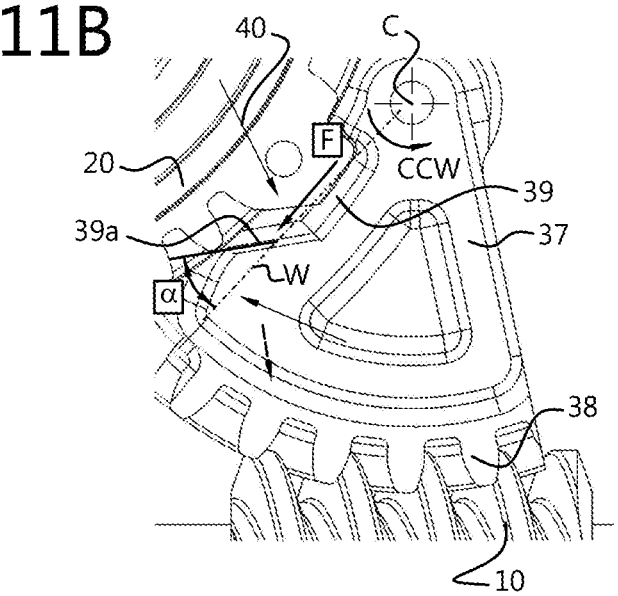
Figure 12A:
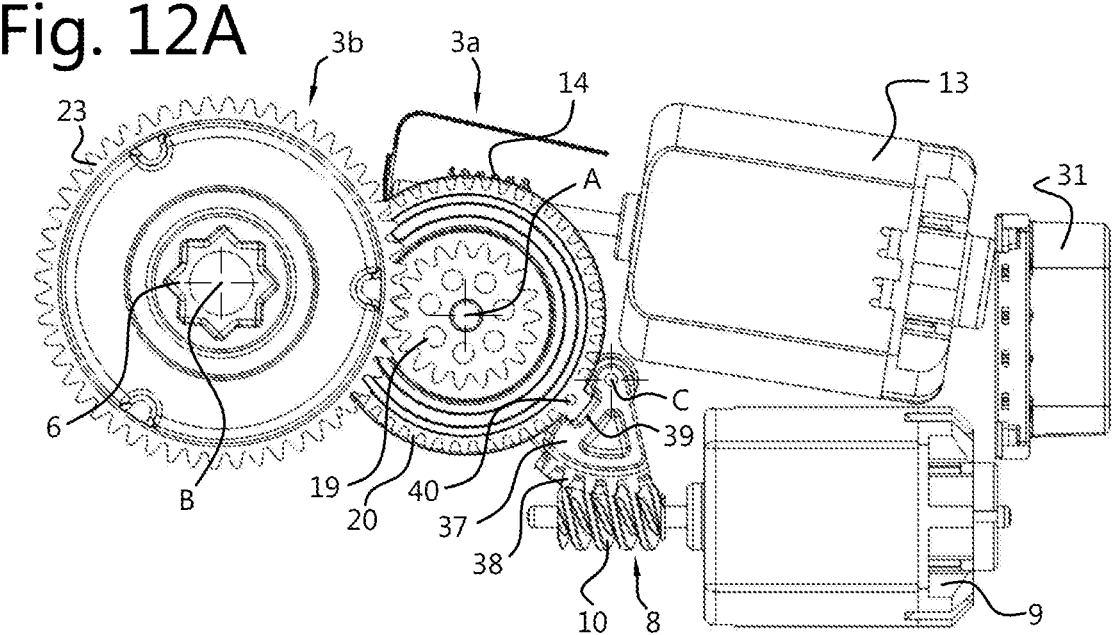
Figure 12B:
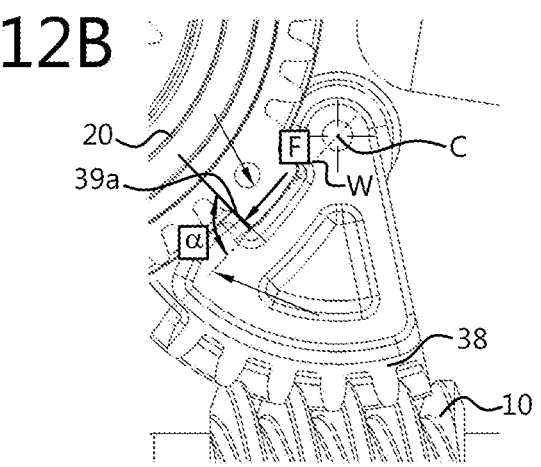
Figure 12C:
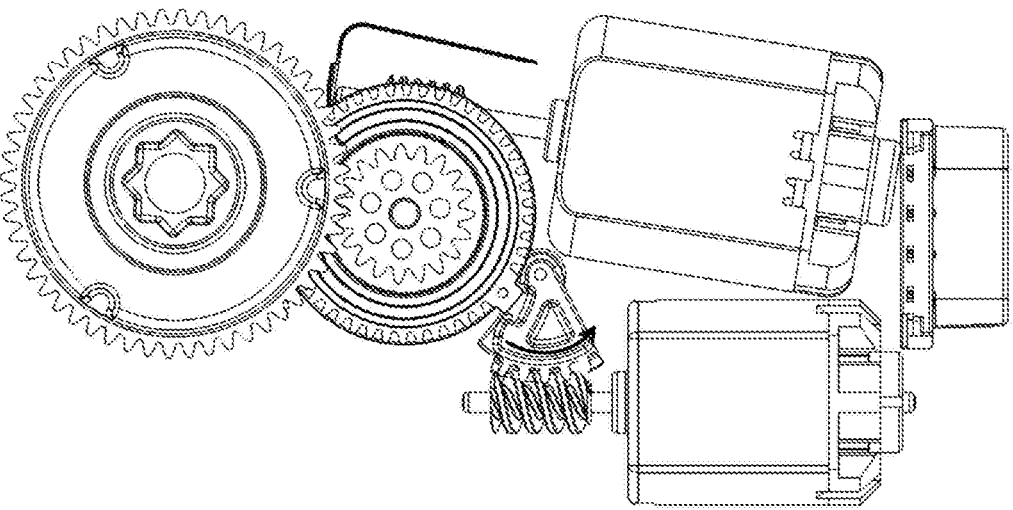
Figure 13A:
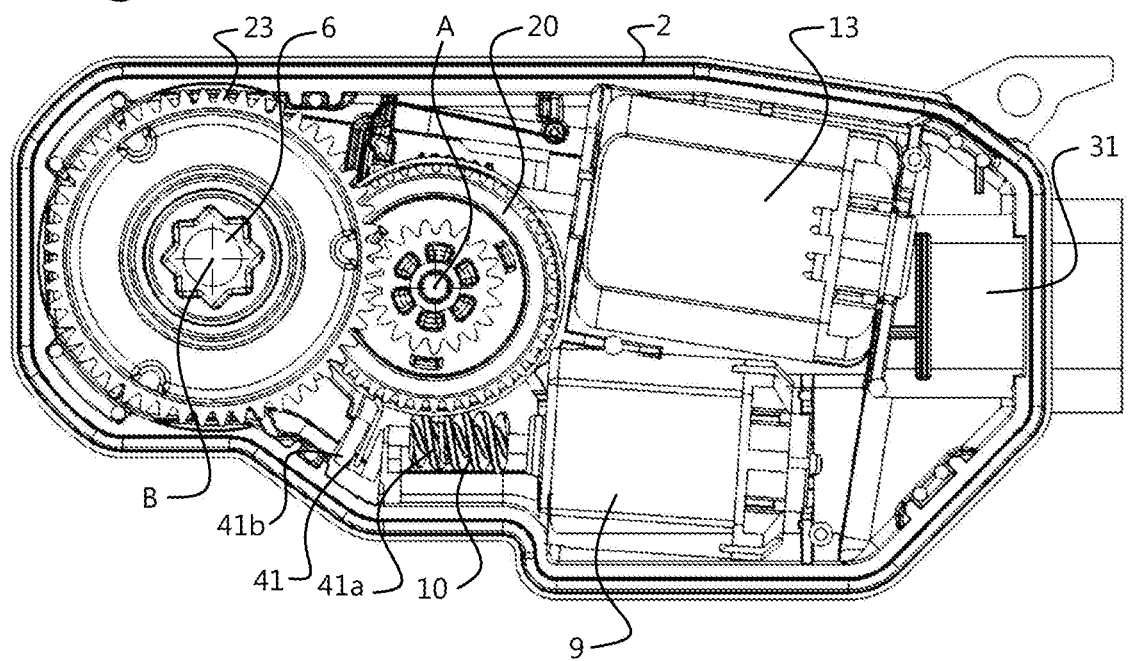
Figure 13B:
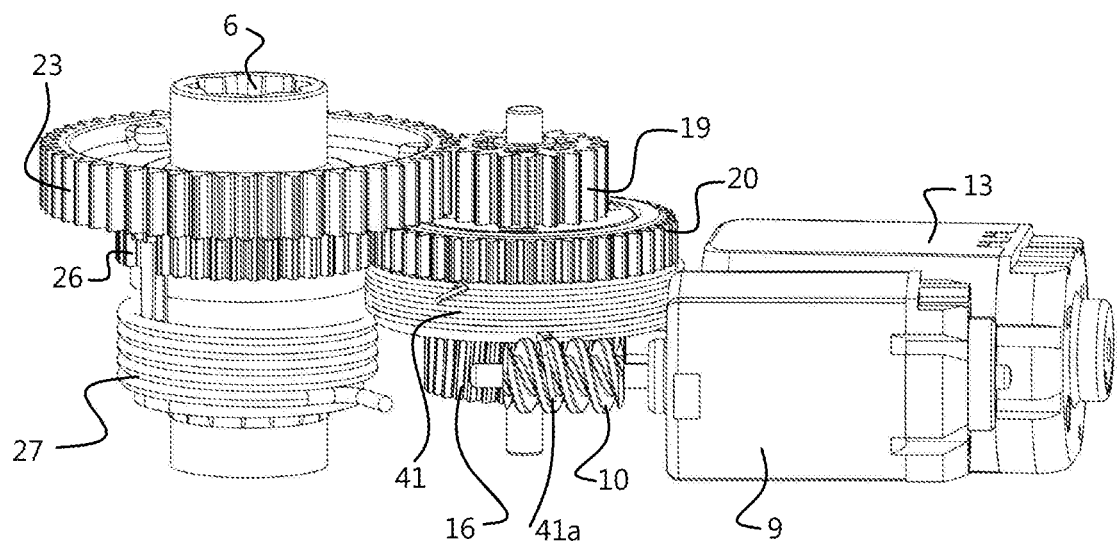
Figure 14A:
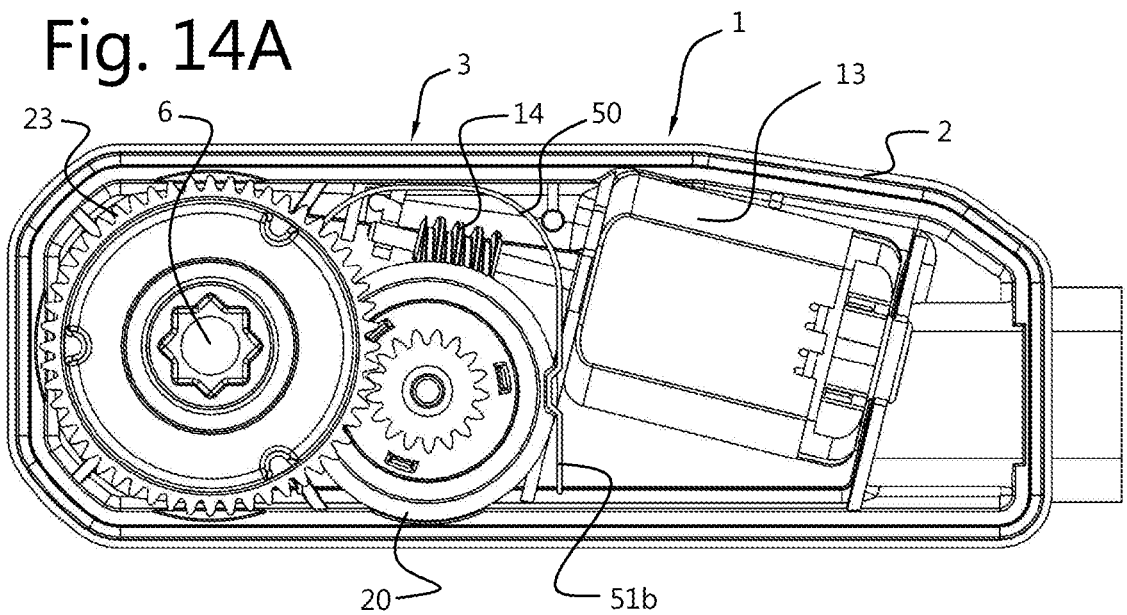
Figure 14B:
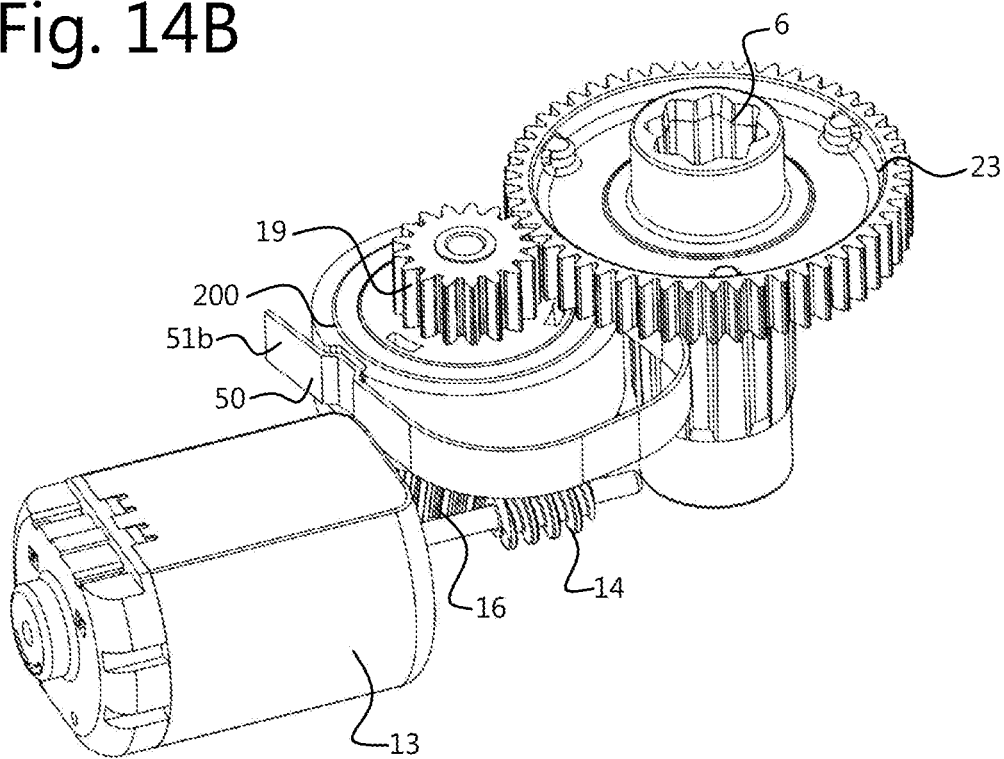
Figure 14C:
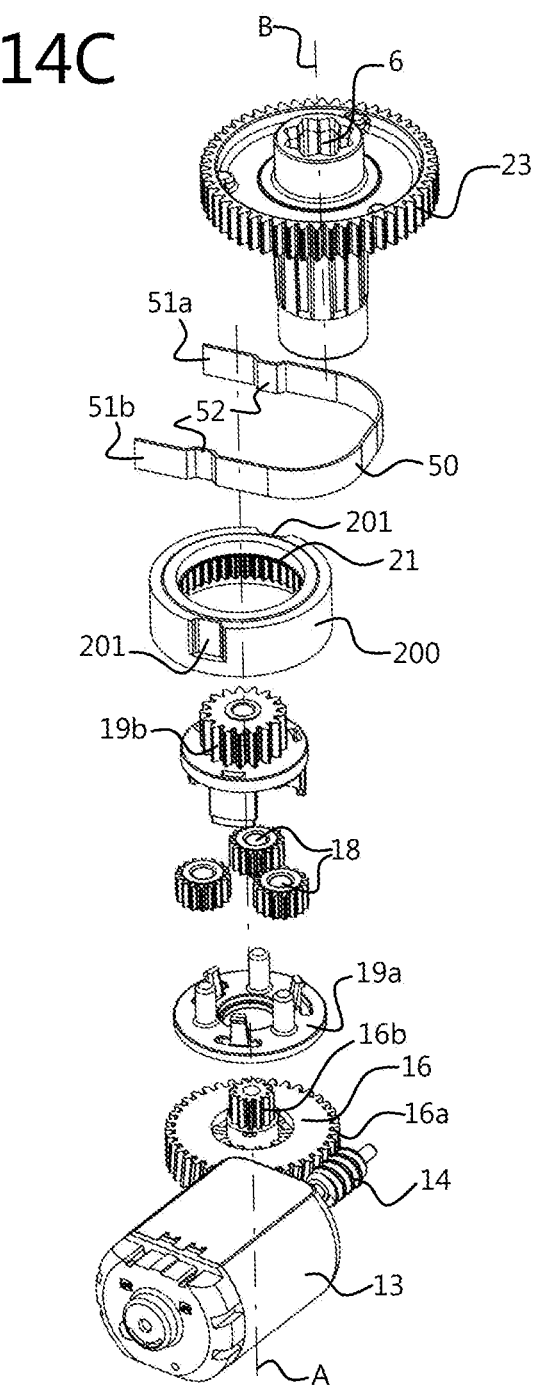
Figure 15A:
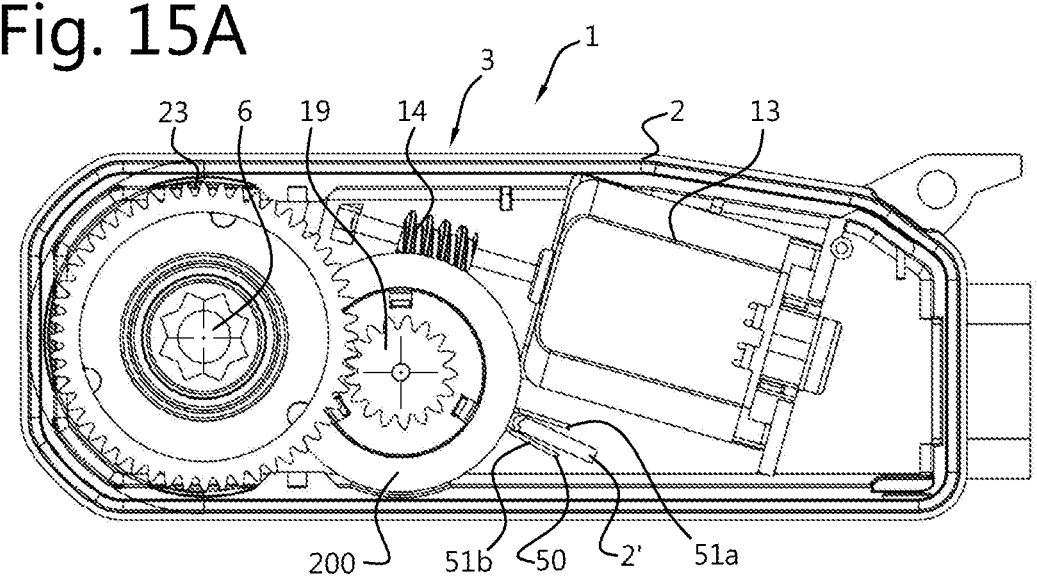
Figure 15B:
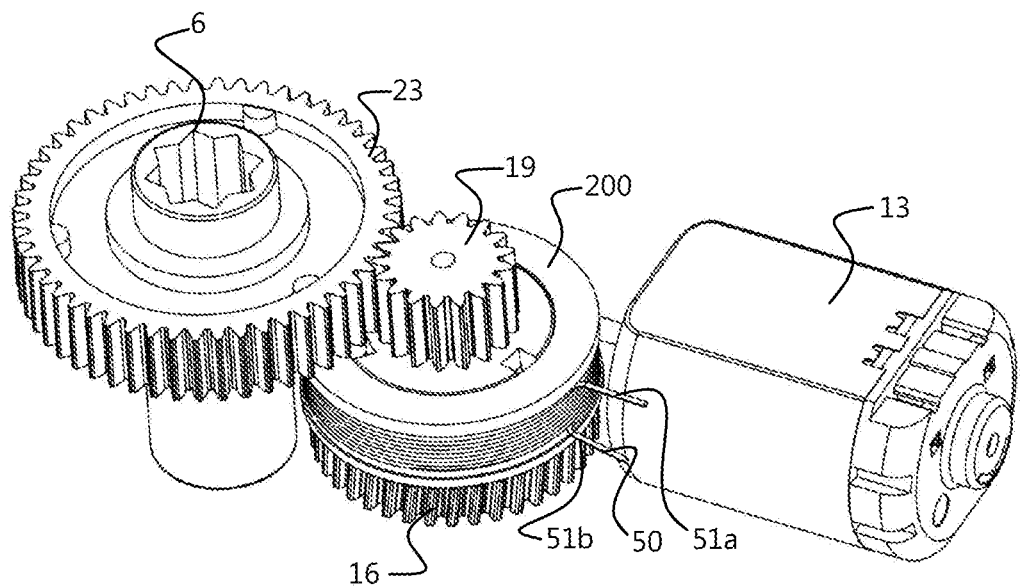

FIG. 10b the driving unit with the failsafe mechanism activated;

FIG. 11a a schematic top plan view of an alternative embodiment of the driving unit with failsafe mechanism without park mechanism, where the failsafe mechanism is not activated;

FIG. 11b a detail of FIG. 11a;

FIG. 12a a schematic top plan view of an alternative embodiment of the driving unit with failsafe mechanism in case a park mechanism is provided, where the failsafe mechanism is not activated;

FIG. 12b a detail of the cam gear of FIG. 12a;

FIG. 12c the embodiment of FIG. 12a with activated failsafe mechanism;

FIG. 13a a schematic top plan view of an alternative embodiment of the driving unit with failsafe mechanism, without park mechanism;

FIG. 13b a schematic perspective view of the embodiment of FIG. 13a;

FIG. 14a a schematic top plan view of an embodiment of the driving unit with breakable ring gear without failsafe mechanism;

FIG. 14b a schematic perspective view of the embodiment of FIG. 14a;

FIG. 14c a schematic perspective exploded view of the embodiment of FIG. 14a and FIG. 14b;

FIG. 15a a schematic top plan view of a second embodiment of the driving unit with breakable ring gear without failsafe mechanism;

FIG. 15b a schematic perspective view of the embodiment of FIG. 15a.

It is noted that the Figures are only schematic representations of exemplary embodiments of the invention. Like parts are designated with like reference numerals.

In FIG. 1 there is shown an adjustment device 1 for adjusting an air influencing element of a motor vehicle. The air influencing element can be an air inlet of a motor compartment, which is usually provided with shutoff elements, such as strips, which are adjustable between a first position, in which the air inlet is substantially closed, and a second position, in which the air inlet is substantially open. The air inlet is not shown here. An air influencing element can also be a spoiler or air dam which is situated preferably at a front or a bottom of the vehicle. The air dam may be adjustable between a first position, in which it extends substantially along the vehicle and a second position, in which it extends from the vehicle at an angle. An air influencing element can also be a wing, which is usually situated at a back or top of the vehicle. The wing may be adjustable between a first position, in which it extends substantially along the vehicle and a second position, in which it extends from the vehicle at an angle, or is at a distance from the vehicle. The adjustment device 1 is here provided with a housing 2 and a driving unit 3 which is included in the housing 2. The housing 2 here comprises two parts, a first housing part 2a in which the driving unit 3 is situated, and a second housing part 2b, which is here implemented as a cover to close off the first housing part 2a.

The housing 2 is provided with an entry opening 4 through which a connecting element can be inserted to be connectable to the driving unit 3. The connecting element can be, for example, a plug of an onboard system, such as a LIN bus system, or other system. The connecting element preferably comprises at least one electricity connection to provide electricity to the driving unit. Optionally, the connecting element may additionally also have a control connection to bring a control signal to the driving unit and/or to bring a control signal from the driving unit back to the onboard system, for example to a central onboard control unit.

The housing 2 is further provided with at least one exit opening 5. Through the output opening 5 can extend an output shaft element 6 of the driving unit 3 to allow it to be further coupled with the air influencing element, for example with strips of the air inlet, with the air dam or with the wing.

The driving unit 3 comprises a first part 3a provided around an axis of the input shaft, hereinafter also input axis A, and comprises a second part 3b provided around the axis of the output shaft, hereinafter also output axis B. The input axis A is at a distance from the output axis B. Preferably, the input axis A is approximately parallel to the output axis B. The output shaft element 6 is situated concentrically around the output axis B. The output shaft element 6 can extend from an end 6a to the opposite end 6b. The output shaft ends 6a, 6b are preferably situated on either side of the housing 2 through openings 5a and 5b respectively in the housing parts 2a, 2b. The output shaft element 6 can extend as a hollow shaft element along axis B.

The first part 3a is coupled to the second part 3b by a gear coupling 7. By making the gear of the second part 3b greater in diameter than the gear of the first part 3a, the second part 3b of the driving unit can be coupled to the first part 3a of the driving unit 3 with a transmission ratio. In this way, the first part 3a of the driving unit 3 does not experience the full forces that are on the output shaft 6, but only, in accordance with the transmission ratio, a part of those forces. Because of this, the first part 3a of the driving unit can be lighter and cheaper in design.

The driving unit 3 here also comprises a failsafe mechanism 8, of which an auxiliary driving motor 9, worm 10, clutch gear 11 and clutch ring 12 are visible in FIG. 1. In case of a calamity, for example a fire in the motor compartment, or a sudden power failure, the failsafe mechanism 8 is activated, and the failsafe mechanism 8 will adjust the output shaft 6 to a predefined position, for example to an open position of the air inlet.

FIG. 2 shows an exploded perspective view of the adjustment device 1. The driving unit 3 is shown in exploded condition. The first part 3a is around the input axis A and the second part 3b is around the output axis B. The first part 3a comprises a main driving motor 13 provided with a worm wheel 14. There is a rod-shaped element 15, a central axis of which coincides with the input axis A. The components of the first part 3a of the driving unit 3 center around this rod-shaped element 15. The worm wheel 14 can cooperate with an input shaft element 16. The input shaft element 16 comprises a worm gear 16a, which can cooperate with worm 14, and comprises a sun gear 16b which forms an input of a planetary gear system 17. The planetary gear system 17 comprises, in addition to the sun gear 16b, three planet gears 18, a planet carrier 19 and a ring gear 20. The ring gear 20 is provided with an internal toothing 21 which is configured to cooperate with the planet gears 18. In addition, the ring gear 20 is provided with an external toothing 22 which is configured to cooperate with a coupling gear 26 which is situated around axis B and is positioned rotatably and centered around the output shaft element 6. The planet gears 18 are positioned on a planet carrier 19, consisting of a carrying part 19a and a gear part 19b. Gear part 19b cooperates with the output gear 23.

The second part 3b of the driving unit 3 comprises, in addition to the output gear 23, a coupling gear 26 which is rotatably positioned around the output gear 23. The coupling gear 26 is preferably rotatably positioned relative to the output gear 23.

Also provided is a tension spring 27. The tension spring 27 is connectable on one side, by end 27a, to the coupling gear 26, and connectable on the other side, by end 27b, to the fixed world, in this case the housing 2 of the adjustment device 1.

The failsafe mechanism 8 in this exemplary embodiment further comprises a small biasing spring 25 for biasing the clutch gear 11 to a release position.

In FIG. 3, the driving unit 3 is shown in a rear view, where the main driving motor 13 is visible. The working of the driving unit 3 is as follows. The main driving motor 13 drives, via the worm 14 and the worm gear 16a, the sun gear 16b. The ring gear 20 of the planetary gear system 17, in normal operating condition, is blocked for rotation by means of the clutch ring 12. Because the ring gear 20 engages by the outer toothing 22 into coupling gear 26, in this way the coupling gear 26 is likewise blocked for rotation and, via the clutch ring 12, nonrotatably connected with the fixed world, namely, the housing 2 of the adjustment device 1.

The planet carrier 19 is the output of the planetary gear system 17. As is known for a planetary gear system, a rotation of the sun gear 16b sets the planet gears 18 in motion and also the planet carrier 19, as output of the planetary gear system 17. The planet carrier 19 in engagement is coupled with the output gear 23 of the second part 3b of the driving unit 3, and thus sets the output gear 23 in motion to adjust the air inlet.

In FIG. 3 it can further be seen that a first end 27a of the tension spring 27 engages behind a lip 30 of the coupling gear 26. In this way, the tension spring 27 is connected with the coupling gear 26.

In an exemplary embodiment, the biasing spring 25 can be omitted; in that case, the adjustment device 1 is provided with a park mechanism 28, as shown in FIG. 4. The park mechanism 28 comprises capacitors 29 as energy storage elements. This makes it possible, as when parking the vehicle whereby the electrical current supply to the adjustment device is cut off, that not the failsafe mechanism is activated, but the park mechanism 28 is activated. Because of the absence of the biasing spring 25, there is no bias of the clutch gear 11 to the release position. The auxiliary driving motor 9 will therefore adjust the clutch gear 11 to a blocking position and keep it there during the normal operating condition. In the case of a park condition, the park mechanism 28 provides that the failsafe mechanism does not discharge and the driving unit remains unchanged, so that the shutoff elements remain in the position they were in prior to parking. Alternatively and/or additionally, the park mechanism 28 may be configured to remember the position of the shutoff elements prior to parking and to adjust the shutoff elements during parking to the open or closed position by the discharge of electrical energy from the capacitors 29 via the auxiliary driving motor 9 and the clutch gear 11 and after parking to readjust them to the prior position. To this end, the park mechanism 28 may be provided with a control unit for remembering the prior position and/or controlling the auxiliary driving motor 9.

Prior to parking, usually, a vehicle control unit first receives a park signal which indicates that the vehicle is being parked. In the absence of such a park signal, upon cut-off of, for example, the current supply, this will be detected as a calamity and the failsafe mechanism will come into operation. In the case of a failsafe condition, the park mechanism can, by discharge of the energy from the energy storage element 29 to the failsafe mechanism 8, activate the failsafe mechanism.

In FIG. 4, there is also shown a connecting element 31 which is accessible through the entry opening 4 of the housing 2. The connecting element 31 is configured to receive a corresponding connecting element, for example of an onboard system. The connecting elements are preferably implemented as known connecting elements for vehicle systems.

The operation of the failsafe mechanism 8 will be explained on the basis of FIGS. 5-10b. FIG. 5 shows the planetary gear system 17 in detail. including the input shaft element 16, a combined worm gear 16a and sun gear 16b, the planet gears 18 and the planet carrier 19. Arranged over the planet carrier 19 is the ring gear 20, provided with an inner toothing 21 which engages the planet gears 18 and an outer toothing 22 which engages in the coupling gear 26.

In FIG. 6 it is shown, furthermore, that the ring gear 20 is provided with ring gear cams 32 which cooperate with recesses 33 in an upper side 12a of the clutch ring 12. The clutch ring 12 itself is provided at an underside 12b with clutch ring cams 34 which fit into recesses 35 of the clutch gear 11. By the biasing spring 25 (not shown in FIG. 6, but shown in FIG. 2) the clutch gear 11 is biased clockwise CW, as seen in the view of FIG. 6. In normal operating condition, when the failsafe mechanism 8 is not activated, the clutch gear 11 is held by the auxiliary driving motor 9 in a counterclockwise CCW direction, against the force of the biasing spring 25, by means of a non-self-braking worm-worm gear drive of the auxiliary driving motor 9, in a blocking position, as shown in FIG. 10a and FIG. 6, in which the clutch ring 12 is connected with the ring gear 20, and the clutch gear 11 is rotatably movable relative to the clutch ring 12. The drive from the main driving motor 13 via the planetary gear system 17 to the output shaft 6 is therefore independent of the failsafe mechanism 8 comprising the clutch gear 11 and the auxiliary driving motor 9.

The angular displacement of the clutch gear 11 is relatively limited, approximately between 10 and 20 degrees, preferably approximately 15 degrees. The clutch ring cams 34 are then on an upper side 11a of the clutch gear 11, so that the clutch gear 11 can rotatably move under the clutch ring 12. The auxiliary driving motor 9, in normal operating condition, thus holds the clutch gear 11 pulled towards itself, against the bias of the biasing spring 25. The main driving motor 13 can drive the driving unit 3 without hindrance from the failsafe mechanism 8.

When there is a calamity, the failsafe mechanism 8 is activated. The current supply then drops out, and the main driving motor 13 and the auxiliary driving motor 9 have no current anymore. The auxiliary driving motor 9 then stops pulling the clutch gear 11 towards itself, and the clutch gear 11, under the influence of the biasing spring 25, moves clockwise CW through the relatively small angular displacement of approximately between 10 and 20 degrees, preferably approximately 15 degrees, to an unblocking position, as shown in FIG. 10b and FIG. 8, in which the ring gear 20 is unblocked in that the clutch ring 12 is connected with the clutch gear 11, and the ring gear 20 is rotatable relative to the clutch ring 12. Due to the auxiliary driving motor 9 being provided with a non-self-braking drive, the worm 10 can move along with the clutch gear 11. As a result of this angular displacement of the clutch gear 11, the clutch ring cams 33 can fall into the recesses 34 in the upper side 11a of the clutch gear 11. The clutch ring 12 at that moment is then fixedly connected with the clutch gear 11 and thereby moves downwards, in direction D, as can be seen in FIG. 7. As a result of this downward movement of the clutch ring 12, the ring gear cams 32 are released from the recesses 33 in which they were confined. In this way, the ring gear 20 is released from the rotation lock, and the ring gear 20 can rotate, as shown in FIG. 8.

The ring gear 20 engages by way of the external toothing 22 into the coupling gear 26. This coupling gear 26 is connected with the tension spring 27. As a result of the ring gear 20 now being freely rotatable, the coupling gear 26 can rotate under the influence of the tension spring 27, and the coupling with the fixed world, i.e., the housing 2, is undone. The ring gear 20 will then move along, as shown in FIG. 9. The coupling gear 26 and the ring gear 20 are now disengaged from the connection with the fixed world, namely the housing 2 via the clutch ring 12, and are now freely rotatable. Because the sun gear 16 of the planetary gear system 17 does not rotate, since the main driving motor 13 is provided with a self-braking drive, the inner toothing 21 of the ring gear 20 will drive the planets 18 and thereby also the planet carrier 19, a characteristic property of a planetary gear system, which will be clear to those skilled in the art. This has as a consequence that also the output gear 23 rotates and sets the output shaft element 6 in motion to adjust the air inlet to the predefined position.

In the case where the driving unit 3 is provided with a park mechanism 28, as shown in FIG. 4, the biasing spring 25 is lacking. In that case, in normal operating condition, the auxiliary driving motor 9 holds the clutch gear 11 pulled towards itself, counterclockwise CCW, in a same blocking position as shown in FIG. 10a. For this, the auxiliary driving motor 9 does not need to be under electrical energization permanently, since there is no biasing spring 25 now whose biasing tension needs to be overcome continuously. In the event of a calamity, when the current supply drops out, the auxiliary driving motor 9 also has no current anymore. Then the capacitors 29 can discharge and carry current to the auxiliary driving motor 9, with which the auxiliary driving motor 9 can push the clutch gear 11 clockwise CW until the clutch ring cams 34 fall into the recesses 35 on the upper side 11a of the clutch gear, and the clutch gear 11 is in the unblocking position. After that, the operation of the failsafe mechanism 8 is as described above, and the position as shown in FIG. 10b can be achieved.

When the driving unit 3 is provided with the park mechanism 28, then, upon the parking of the car, and hence upon the controlled shutting off of the current supply, no change in the driving unit 3 will come about, because the biasing spring 25 is lacking. Only in the case of a calamity, upon an unforeseen or an uncontrolled shutoff of the current supply, will the failsafe mechanism 8 come into operation. For, in the case of parking, the driving unit 3, in particular a control unit of the driving unit 3, receives a 'park' signal from the onboard system prior to the controlled shutoff of the current supply. Thereupon the control unit can block the discharge of the capacitors. In the absence of this parking signal and upon drop-out of the current supply, it may be said that a calamity is in evidence, and the failsafe mechanism 8 will come into operation by the discharge of the capacitors 29.

Optionally, the current of the capacitors 29 may also be used, prior to startup of the engine of the motor vehicle, to check whether electricity cables and/or data cables and/or other cables are still intact, that is, whether current and/or data can still pass through them. In some areas, (stone) martens are quite common; they can gnaw through cables and/or lines while the vehicle is parked. Prior to starting up the engine, by using a little current from the capacitors to check the intactness of the cables, it can be established whether the cables are still intact. Should any of the cables not be entirely intact anymore, this could hinder the current supply to the driving unit 3, as a result of which the failsafe mechanism 8 would come into operation, still, upon startup of the engine. By recognizing this beforehand, the control unit of the driving unit 3 can, for instance, maintain the parking condition, or alternatively choose to put the failsafe mechanism into operation after all.

After activation of the failsafe mechanism 8, the failsafe mechanism 8 can be reset when there is current supply again. The main driving motor 13 drives the planetary gear system 17, and the planet carrier 19 adjusts the output shaft element 6 to a predefined position, usually a first position of the air influencing element. When the air influencing element, for example the strips of the air inlet or the air dam or the wing, is in an end position, such as the first position, the planet carrier 19 will also be unable to rotate any further and will block. Via the planets 18, the ring gear 20 will then be driven until the tension spring 27 is fully tensioned and the driving unit 3 blocks. The current supply remains in operation, but due to the blocked driving unit 3 the main driving motor 13 will also block, which leads to an increased current, the so-called stalling current. This stalling current is detected and thereupon the auxiliary driving motor 9 is provided with current. The auxiliary driving motor 9 can thereupon rotate the clutch gear 11 and the clutch ring 12 to the blocking position, against the bias of the biasing spring 25, or not so, depending on the embodiment.

The driving unit 3 may be provided with a control unit. This control unit may be situated in the housing of the adjustment device 1, for example on a printed circuit board 36 as shown in FIG. 4. The control unit may also be outside the housing. The control unit may be configured to receive signals from the onboard system, but may also be configured, in addition, to feed signals back to the onboard system, for example about the operating condition of the driving unit.

FIGS. 11*a* and 11*b* show an alternative embodiment of the failsafe mechanism 8. In this exemplary embodiment, the failsafe mechanism 8 is implemented with a cam gear 37 instead of the clutch ring 12 and the clutch gear 11 of the preceding embodiment. The cam gear 37 on one side cooperates with the ring gear 20 and on the other cooperates with the worm 10 of the auxiliary driving motor 9. For cooperation with the worm 10, the cam gear 37, analogously to the clutch ring 11, is provided with a toothing 38. For cooperation with the ring gear 20, the cam gear 37 is provided with a recess 39 into which fits a cam 40 of the ring gear 20. The cam gear 37 is rotatably attached to the fixed world, i.e., the housing 2, around a rotation axis C.

In this exemplary embodiment, no park mechanism is provided. This means that the auxiliary driving motor 9 is continuously in driving condition and pulls the cam gear 37 towards itself. In this way, there is no need for a small biasing spring because the ring gear 20 with the coupling gear 26 are biased by the tension spring 27. The cam 40 and the recess 39 are so configured that the cam gear 37 is not self-blocking relative to the ring gear 20. By means of a spring—not shown—the ring gear 20 is biased for a clockwise rotation, so that the cam 40 is pushed against a surface 39*a* of the recess, under the influence of the spring action. The cam gear 37 thus retains the cam 40 of the ring gear 20 in the blocking position, and the auxiliary driving motor 9 pulls the cam gear 37 towards itself constantly, against the force of the spring action, of, for example, a tension spring 27. For example, the spring action for biasing the ring gear 20 is implemented as in the implementation of FIGS. 1 to 10, utilizing a coupling gear 26 and a tension spring 27. Other variants are obviously also possible.

A reaction force F of the cam 40 on the cam gear 37, resulting from the spring action, is not self-blocking because the surface 39*a* of the recess 39 against which the cam 40 abuts includes an angle alpha with respect to a line of action W through the rotation axis C. The angle alpha is preferably <90 degrees. This line of action W is parallel to the reaction force F, but, because of the geometry of the cam 40 and the surface 39*a*, does not coincide with it. As a result, the reaction force F exerts a moment around the rotation axis C, thus seeking to 'push away' the cam gear 37 counterclockwise CCW. Hence, an energization from the auxiliary driving motor 9 is constantly necessary to undo this moment and hold the cam 40 blocked in the cam gear 37, as a result of which the ring gear 20 is also connected with the fixed world, i.e., the housing 2, via the cam gear 37.

In the case of a calamity, the current supply drops out and hence also the drive by the auxiliary driving motor 9, and the moment exerted by the reaction force F provides that the cam gear 37 is 'pushed away' around rotation axis C and the blocking of the ring gear 20 is undone. The ring gear can now, under the influence of the spring action of, for example, the tension spring 27, rotate freely, because of the non-self-braking drive of the auxiliary driving motor 9. The sun gear 16 of the planetary gear system 17, by contrast, is blocked by the self-braking drive 14 of the main driving motor 13, so that the planet carrier 19 can rotate. Because of the planet carrier 19 being coupled with the output gear 23, the output shaft element 6 and thus the air influencing element can be adjusted to the predefined position. This embodiment is more compact than the embodiment shown in FIGS. 1 to 10. The failsafe spring 25, the clutch ring 12 and the clutch gear 11 have been omitted here.

FIGS. 12*a* and 12*b* show a variant on the embodiment of FIGS. 11*a* to 11*b*, in which a park mechanism is provided. The park mechanism 28, while not shown, may, similarly to the embodiment of FIGS. 3, 4 or FIGS. 10*a*, 10*b*, comprise capacitors 29. The ring gear 20, under the influence of spring action, for example of a tension spring 27, is biased for a clockwise CW rotation. The auxiliary driving motor 9 brings the cam gear 27 to the blocking position, so that the cam 40 can be retained in the recess 39. Due to the configuration of the cam 40 and corresponding recess 39, the cam remains in the recess 39 despite the spring action on the ring gear 20. Because of this, the auxiliary driving motor 9 does not need to energize the cam gear 37 constantly. The failsafe mechanism 8 here likewise comprises a cam gear 37 which is provided with a recess 39 that cooperates with a cam of the ring gear 20. The surface 39a here includes an angle alpha that is greater than or equal to 90 degrees with the line of action W. The cam 40 is shaped correspondingly to the surface 39a. Because of the friction of the cam with the surface 39a and because of the geometry of the surface 39a, the reaction force F now exerts a self-blocking effect. As a result, the cam gear 37, under the influence of the spring action of the ring gear 20, remains coupled with the cam 40 by the force F. The auxiliary driving motor 9 hence does not have to drive the cam gear 37 continuously. In the case of a calamity, the capacitors 29 of the park mechanism 28 will discharge, and drive the auxiliary driving motor 9 to pull the cam gear 37 away from the cam 40, so that the cam 40 comes clear of the recess 39. As a result, the cam gear 37 is uncoupled from the ring gear 20 and the ring gear 20 can rotate under the influence of the spring action, so that the output shaft element 6 can be adjusted.

In a first alternative embodiment of the clutch mechanism represented in FIGS. 11a to 12c, the failsafe mechanism 8 comprises a wrap spring 41 and an auxiliary driving motor 9, shown in FIGS. 13a, 13b. An optional biasing spring 25, a clutch gear 11, 37 or clutch ring 12 has been omitted here. The wrap spring 41 is connected on one side with the worm 10 of the auxiliary driving motor 9, and on the other side with the fixed world, i.e., the housing 2. The wrap spring 41 is situated around the ring gear 20 to block the ring gear 20 in a blocking position. The working of a wrap spring is well known and is based on a normal force exerted between the spring and the corresponding part, here a collar of the ring gear 20. By twisting the spring together, the spring and the corresponding part are coupled, by twisting the other way, the spring and the corresponding part are uncoupled. In normal operating condition, when no calamity occurs, the wrap spring 41 is wound up by the auxiliary driving motor 9, so that the wrap spring 41 is nonrotatably coupled with the ring gear 20. An end 41a of the wrap spring 41 is between the teeth of the worm 10 and in this way adjusts along when the worm 10 is adjusted by the auxiliary driving motor 9. Another end 41b of the wrap spring 41 is fixedly connected with the housing 2. In the exemplary embodiment of FIGS. 13a and 13b, there is no park mechanism 28 present and the auxiliary driving motor 9 keeps the wrap spring 41 tensioned. In the case of a calamity, when the current supply is interrupted, the auxiliary driving motor 9 has no current anymore, and the wrap spring 41, because of the non-self-braking drive of the auxiliary driving motor 9, can relax. As a result of the wrap spring 41 relaxing, the ring gear 20 is uncoupled from the wrap spring 41, and the ring gear 20 can rotate freely. Optionally, an additional biasing spring may be provided in order to bring the worm 10 with wrap spring 41 to the biased position in case of a calamity. As in the preceding embodiments, under the influence of the spring action of the tension spring 27, the coupling gear 26 and thus the output gear 23 can adjust to the predefined position. In the case where a park mechanism 28 is provided, the wrap spring 41, once brought in the tensioned position, can remain in the tensioned position and be pulled out of the tensioned position by the auxiliary driving motor 9 in case of a calamity.

FIGS. 14a, 14b, 14c, 15a, 15b show embodiments of an adjustment device 1 without failsafe mechanism, but provided with a ring gear 20. By means of a break element 50 the ring gear 20 is breakably connected with the fixed world, i.e., the housing 2. The driving unit 3 comprises components the same as or similar to the driving unit 3 of the foregoing embodiments. The driving unit 3 comprises a driving motor 13, usually an electric motor, which, via a worm 14, drives an input shaft element 16. Via the worm gear 16a and the sun gear 16b coupled thereto, the planet gears 18, which are supported on the carrying part 19a of the planet carrier 19, are set in motion. The ring gear 20 which is provided with an inner toothing is breakably connected, via the break element 50, with the fixed world and in normal operating condition is fixed. The gear part 19b of the carrier 19 is coupled with the output gear 23 to set the output shaft element 6 in motion to thus adjust an element to be adjusted, such as a valve or a strip or an air dam or a wing. As in foregoing embodiments, a first part 3a of the driving unit 3 is centered around the first axis A, and a second part 3b of the driving unit 3 is centered around the second axis B, which is parallel to the first axis A. When large, external, forces occur, for example a stone hitting the element to be adjusted, or an obstacle striking the element to be adjusted, the force may be so large that the break element 50 breaks loose from the locking. As a result, the ring gear 20 comes clear of the fixed world and can rotate, as a result of which the element to be adjusted, due to the self-braking drive of the main driving motor 13, can adjust. This obviates or reduces damage to the element to be adjusted caused by external impact. This is relevant in particular for so-called air dams or spoilers. Such air dams or spoilers can be present at different points on a motor vehicle, especially under the vehicle, where they are especially susceptible to external impact. By providing the ring gear 20 with the break element 50, damage resulting from external impact can be reduced or obviated and the valve can, as a result of such external impact, be adjusted to a predefined position, usually the closed position.

In the embodiment of FIGS. 14a, 14b and 14c, the break element 50 is implemented as a U-shaped spring which is retained by its ends 51a, 51b in the housing 2 and which is provided with small kinks 52 by which the break element, such as a spring 50, can be received in recesses 201 of the ring gear 20. Due to the spring action of the U-shaped break element 50, here the U-shaped spring 50, the U-shaped spring clenches the ring gear 20, as it were, and thus the spring 50 locks the ring gear 20. Upon too great an external impact, greater than the biasing force of the spring, the lock between the kinks 52 and the recesses 201 can be broken and the ring gear can rotate freely.

In the embodiment of FIG. 15a and FIG. 15b, the break element 50 is implemented as a wrap spring, which, in tensioned position, strangles the ring gear 20, so to speak, and thus retains it. Ends 51a, 51b of the wrap spring 50 are situated around a projection 2' of the housing and in this way can push off from the fixed world, namely the projection 2'. Upon too great an external impact, greater than the maximum retaining moment of the wrap spring, at least one of the two ends 51 comes loose from the projection 2' of the housing 2 and the wrap spring 50 can thus expand in diameter and in this way uncouple the ring gear 20, so that the ring gear 20 can rotate freely and can adjust the output shaft 6 in a similar manner to that in the foregoing embodiment described.

The invention has been elucidated hereinabove for air influencing elements for a motor vehicle. However, the adjustment device may be implemented and applied in the same manner for an adjustment device for adjusting fluid influencing elements, such as a liquid valve which may for instance be placed in a pipe. It will be clear that the adjustment device can have many uses, in particular for adjustment of valves, such as liquid valves. An aspect of the invention therefore also concerns an adjustment device for adjusting a fluid influencing element, such as a valve, between at least a first position and a second position, comprising a driving unit for adjusting the fluid influencing element between at least the first position and the second position provided with an input shaft and an output shaft which is at a distance from the axis of the input shaft, wherein the driving unit has a first part which is provided around the input shaft of the driving unit, and a second part which is provided around the output shaft of the driving unit, wherein the adjustment device is furthermore provided with a failsafe mechanism, wherein the failsafe mechanism engages the first part of the driving unit, wherein the failsafe mechanism comprises an auxiliary driving motor, separately from a main driving motor of the driving unit. All the above-described aspects and variants, without exception and without modification, also apply to an adjustment device for a fluid influencing element. For clarity and conciseness, the description thereof has not been repeated for an adjustment device for a fluid influencing element.

For purposes of clarity and a concise description, herein features have been described as part of the same or different embodiments, but it will be clear that the scope of protection of the invention can encompass embodiments with combinations of any or all of the features described. It will be appreciated that the embodiments shown have the same or similar components, apart from where they have been described as different.

In the claims, reference signs placed in parentheses are not to be construed as limiting on the invention. The word 'comprising' does not preclude the presence of other features or steps than those specified in a claim. Further, the words 'a(n)' and 'one' should not be construed as limiting to 'just one', but instead are used to indicate 'at least one', and do not preclude plurality. The mere fact that certain measures are cited in mutually different claims does not mean that a combination of these measures cannot be used to advantage. Many variants will be clear to those skilled in the art. All variants are understood to be comprised within the scope of protection of the invention as defined in the following claims.

Adjustment device 1
Housing 2
First housing part 2*a*
Second housing part 2*b*
Driving unit 3
Entry opening housing 4
Exit opening housing 5
Output shaft element 6
Gear coupling 7
Failsafe mechanism 8
Auxiliary driving motor 9
Worm (auxiliary driving motor) 10
Clutch gear 11
Upper side clutch gear 11*a*
Clutch ring 12
Upper side clutch ring 12*a*
Underside clutch ring 12*b*
Main driving motor 13
Worm (main driving motor) 14
Rod-shaped element 15
Input shaft element 16
Worm gear 16*a*
Sun gear 16*b*
Planetary gear system 17
Planet gears 18
Planet carrier 19
Carrying part 19*a*
Gear part 19*b*
Ring gear 20
Internal toothing ring gear 21
External toothing ring gear 22
Output gear 23
VOID 24
Biasing spring 25
Coupling gear 26
Tension spring 27
First end tension spring 27*a*
Second end tension spring 27*b*
Park mechanism 28
Capacitor 29
Lip 30
Connecting element 31
Ring gear cams 32
Recess 33
Clutch ring cams 34
Recess clutch gear 35
Printed circuit board 36
Cam gear 37
Cam gear toothing 38
Recess cam gear 39
Surface of recess 39*a*
Cam of ring gear 40
Wrap spring 41
Break element 50
Ends of break element 51*a*, 51*b*
Kink of break element 52

The invention claimed is:

1. An adjustment device for adjusting an air influencing element of a motor vehicle between at least a first position and a second position, comprising a driving unit for adjusting the air influencing element between at least the first position and the second position provided with an input shaft and an output shaft which is at a distance from an axis of the input shaft, wherein the driving unit has a first part which is provided around the input shaft of the driving unit, and has a second part, wherein the adjustment device is furthermore provided with a failsafe mechanism, wherein the failsafe mechanism engages the first part of the driving unit, wherein the failsafe mechanism comprises an auxiliary driving motor, separately from a main driving motor of the driving unit, wherein the auxiliary driving motor is configured for driving the failsafe mechanism, and wherein the auxiliary driving motor is not configured for driving the output shaft.

2. The adjustment device according to claim 1, wherein the second part is provided around the output shaft of the driving unit.

3. The adjustment device according to claim 1, wherein the second part is provided at a distance from the output shaft of the driving unit.

4. The adjustment device according to claim 1, wherein the second part of the driving unit is coupled to the first part of the driving unit with a transmission ratio.

5. The adjustment device according to claim 1, wherein the input shaft is connected with a main driving motor and the output shaft is arranged to be connectible with the air inlet.

6. The adjustment device according claim 1, wherein the first part of the driving unit comprises a planetary gear system, comprising a sun gear, at least one planet gear, a planet carrier and a ring gear, wherein the sun gear is connected with the input shaft.

7. The adjustment device according to claim 1, wherein the second part of the driving unit comprises an output gear which forms the output shaft of the driving unit.

8. The adjustment device according to claim 6, wherein the ring gear of the planetary gear system is detachably connected with a housing of the adjustment device.

9. The adjustment device according to claim 7, wherein the output gear of the second part of the driving unit is coupled with a transmission ratio to an output of the planetary gear system of the first part of the driving unit wherein the planetary gear system comprises a sun gear, at least one planet gear, a planet carrier and a ring gear, wherein the sun gear is connected with the input shaft, and the output gear of the second part is coupled to the planet carrier of the planetary gear system.

10. The adjustment device according to claim 8, wherein the failsafe mechanism is configured to uncouple the ring gear of the planetary gear system from the housing, in a failsafe condition, to adjust an output of the second part of the driving unit.

11. The adjustment device according to claim 10, wherein the second part of the driving unit comprises a coupling gear which is rotatably positioned around the output gear of the second part of the driving unit and which is in engagement with the ring gear of the planetary gear system of the first part of the driving unit.

12. The adjustment device according to claim 11, wherein the coupling gear is pretensioned.

13. The adjustment device according to claim 10, wherein the failsafe mechanism comprises a clutch ring which is axially movable in a direction of the input shaft of the first part of the driving unit and is rotation-locked with the housing of the adjustment device, and/or wherein the ring gear is detachably coupled with the clutch ring.

14. The adjustment device according to claim 13, wherein the failsafe mechanism furthermore comprises a clutch gear which is couplable with the clutch ring, wherein the clutch ring is configured to be pretensioned to a release position, in case of a failsafe condition, under the influence of the elastic element, and is configured to be held by the auxiliary motor, against the force of the pretension, in a blocking position.

15. The adjustment device according to claim 10, wherein the failsafe mechanism comprises a cam gear which is couplable with the first part of the driving unit and is rotation-locked with the housing.

16. The adjustment device according to claim 15, wherein a coupling of the cam gear with the first part of the driving unit comprises a cam on the ring gear which is receivable in a recess on the cam gear.

17. The adjustment device according to claim 1, wherein the failsafe mechanism comprises a wrap spring.

18. The adjustment device according to claim 1, furthermore comprising a park mechanism, comprising an energy storage element.

19. The adjustment device according to claim 18, wherein the park mechanism is configured, in case of a park condition, to leave the driving unit stationary, and, in case of a failsafe condition, to activate the failsafe mechanism by discharge of the energy from the energy storage element to the failsafe mechanism.

20. An air influencing element of a motor vehicle provided with an adjustment device according to claim 1, wherein the air influencing element is at least one of an air inlet, an air dam, or a wing.

21. A method for adjusting an air influencing element of a motor vehicle, comprising providing an adjustment device according to claim 1.

22. The adjustment device according to claim 11, wherein the coupling gear is coupled with an external toothing on the ring gear of the planetary gear system of the first part of the driving unit.

23. The adjustment device according to claim 18, wherein the energy storage element comprises a capacitor.

* * * * *